April 6, 1943.  G. E. KING  2,315,625

PROTECTIVE CONTROL SYSTEM

Filed Oct. 24, 1940

WITNESSES:
Edward Michaels
G. V. Giolma

INVENTOR
George E. King.
BY
Crawford
ATTORNEY

Patented Apr. 6, 1943

2,315,625

UNITED STATES PATENT OFFICE 2,315,625

PROTECTIVE CONTROL SYSTEM

George E. King, Wilkinsburg, Pa., assignor to Westinghouse Electric & Manufacturing Company, East Pittsburgh, Pa., a corporation of Pennsylvania Application October 24, 1940, Serial No. 362,584

6 Claims. (Cl. 171—119)

My invention relates generally to control systems, and it has reference in particular to a safety or protective control system for use with alternating current arc welding apparatus.

Generally stated, it is an object of my invention to provide in a simple and effective manner for reducing the normal open circuit voltage of a transformer type alternating current arc welder to prevent the operator from receiving a shock therefrom by accidental contact with a welding electrode.

More specifically, it is an object of my invention to provide a safety or protective control unit which may be connected between an alternating current arc welder and a source of welding current to effect a reduction of the open circuit voltage of the welder to a safe value a predetermined interval of time after the termination of a welding operation.

Another object of my invention is to provide for controlling the secondary voltage of a transformer type alternating current arc welder by means of a control unit which may be connected in the primary circuit of the welder.

A further object of my invention is to provide a safety control system for automatically reducing the arc circuit voltage of an arc welder to a safe value a predetermined interval of time after the termination of a welding operation, without requiring reduced voltage taps on the arc welder.

Yet another object of my invention is to provide for normally reducing the voltage applied to the primary winding of a transformer type alternating current arc welder, applying the full voltage thereto as soon as the welding circuit is completed, and reducing the voltage applied thereto a predetermined interval of time after interruption of the welding circuit.

Still another object of my invention is to provide for automatically connecting an impedance in series circuit relation with the primary winding of a transformer type alternating current arc welder so as to reduce the open circuit secondary voltage of the welder to a safe value a predetermined interval of time after the secondary circuit is opened.

Other objects will in part be obvious, and will in part appear hereinafter.

In accordance with my invention, a simple and effective safety or protective control unit may be provided for connection between the primary winding of a transformer type alternating current arc welder and a source of alternating current to reduce the open circuit secondary voltage of the welder to a safe value a predetermined time after the operator has terminated a welding operation. Such a unit may comprise generally, an impedance which may be connected between one terminal of the welder and the source and a switch for completing a shunt circuit about the impedance under predetermined conditions. A time delay relay may be utilized to control the operation of the switch so as to maintain it in the closed position for a predetermined time after the termination of a welding operation. A relay responsive to the closure of the welding circuit may be provided to effect operation of the time delay relay so as to effect operation of the switch to shunt the impedance and apply normal voltage to the primary winding of the welding transformer when the secondary or welding circuit is closed.

For a more complete understanding of the nature and scope of my invention reference may be had to the following detailed description which may be taken in connection with the accompanying drawing, in which.

Figure 1:
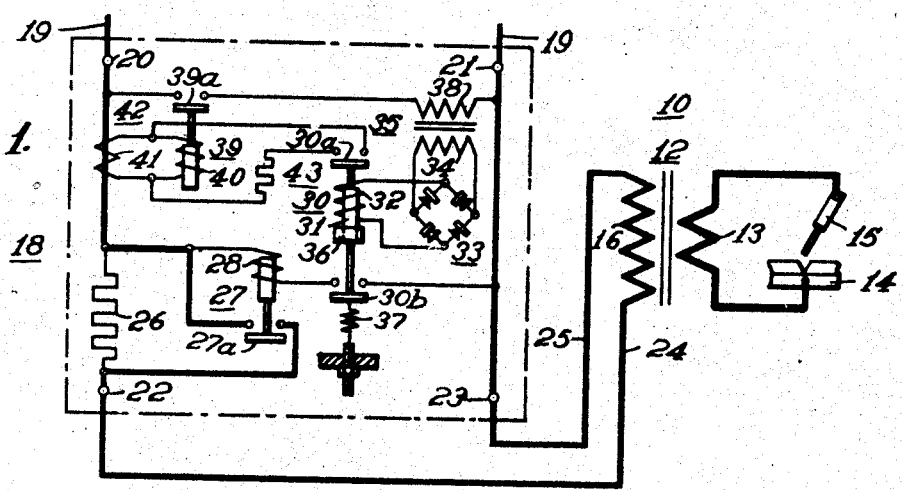
Figure 1 illustrates diagrammatically a welding system embodying the principal features of the invention.

Referring to Fig. 1, the reference numeral 10 may denote, generally, an alternating current arc welding system utilizing an arc welder 12 of the transformer type having a secondary winding 13 connected to a welding circuit including the work 14 upon which a welding operation is to be performed and an electrode 15. The primary winding 16 may be connected to any suitable source of alternating current power.

In order to protect a welding operator from shocks when changing or accidentally coming into contact with the electrode 15 while he is grounded or electrically connected to the work 14, suitable means such as the safety or protective control unit 18 may be provided, being for example connected between the primary winding 16 and the conductors 19, which are connected to a suitable source of alternating current.

The control unit 18 may be provided with line terminals 20 and 21 to which the conductors 19 may be connected, and load terminals 22 and 23 which may be connected by means of conductors 24 and 25, respectively, to the opposite terminals of the primary winding 16. For the purpose of normally reducing the open circuit voltage of the secondary winding 16 to a safe value when the operator is not welding, suitable means such as the impedance 26 may be connected between the terminals 20 and 22 to reduce the voltage across the primary winding 16 under no load conditions to such a value that the voltage across the secondary winding 13 of the welder is reduced to a safe value, for example, about 30 volts, instead of the normal open circuit voltage which may be from 70 to 85 volts. A switch 27 having an operating winding 28 may be provided for controlling the connections of the impedance 26 by completing a shunt circuit about the impedance through contact members 27a to apply the full voltage of the source to the primary winding 16 under predetermined conditions.

In order to control the energization of the operating winding 28 so as to enable the operator to change or renew the electrode 15 safely, suitable means may be provided to effect operation of the switch 27 to shunt the impedance 26 whenever the welding circuit is closed, and maintain the switch in the closed position for a predetermined interval after the welding circuit is opened, such as, for example, the time delay relay 30.

The time delay relay 30 may be provided with an armature 31 actuated by an operating winding 32 which may be energized from a suitable source of direct current voltage such as the rectifier bridge circuit 33, connected to the secondary winding 34 of a control transformer 35. The relay 30 may further be provided with suitable means to maintain it in the operative position for a predetermined interval of time after its operating winding 32 is deenergized. For example, a short-circuited damper winding 36 may be positioned about the armature 31 to prevent the sudden collapse of the magnetic flux therein and thus delay the return of the armature 31 to the deenergized position when the operating winding 32 is deenergized. Suitable adjusting means such as, for example, the adjustable spring 37 may be provided for adjusting the duration of the delay.

With a view to controlling the energization of the operating winding 32, suitable control means responsive to the closure of the welding circuit may be provided, such as, for example, the current responsive relay 39 for controlling the connection of the primary winding 38 of the control transformer 35 to the source. The relay 39 may be provided with contact members 39a and an operating winding 40 which may be energized from the secondary winding 41 of a current transformer 42, the primary winding of which may be connected in series circuit relation with the impedance 26.

In order to permit the current responsive relay 39 to respond to differences in the relatively small values of the primary current of the transformer welder 12 while the impedance 26 is connected in series circuit relation therewith, and not be damaged by the relatively heavy current flowing in the primary circuit after the impedance 26 is shunted out of the primary circuit, suitable means may be provided for limiting the amount of current in the operating winding 40 of the current-responsive relay 39. For example, a control resistor 43 may be connected in shunt circuit relation with the operating winding 40 of the current responsive relay 39 through contact members 30a of the time delay relay, so as to by-pass the operating winding 40 under load conditions.

When the primary winding 16 of the welding transformer 12 is connected through the control unit 18 to the conductors 19, and the welding circuit connected to secondary winding 13 is open, a relatively small magnetizing current flows through the impedace 26 and the primary winding 16. The impedance 26 may be of such a value that the voltage across the primary winding is sufficiently reduced to produce an open circuit voltage across the secondary winding 13 between the electrode 15 and work 14 of, for example, about 30 volts, which may be considered a safe value. The current flowing through the primary winding 16 under these conditions is insufficient to operate the current responsive relay 39.

When the electrode 15 is brought into contact with the work 14, so as to short-circuit the secondary winding 13, the current flowing through the primary winding 16 increases, so that the current responsive relay 39 operates, closing its contact members 39a and connecting the primary winding 38 of the transformer 35 to the source of alternating current. The operating winding 32 of the time delay relay 30 is energized, and the armature 31 operates, closing contact members 30a and 30b, thus connecting the control resistor 43 in parallel with the operating winding 40 of the current responsive relay 39 and connecting the operating winding 28 of the switch 27 to the source. The switch 27 operates, closing contact members 27a and completing a shunt circuit about the impedance 26. The full voltage of the alternating current source is then applied across the primary winding 16 of the welder 12 so that the normal welding voltage may be obtained between the electrode 15 and the work 14 for performing the desired welding operation.

If the welding circuit is interrupted momentarily, the current responsive relay 39 may return momentarily to the deenergized position because of the reduction in the current flowing through the primary winding 16 of the welder, but the time delay relay 30 remains in the energized position for a predetermined interval of time. The full open circuit voltage is therefore retained between the electrode 15 and the work 14 for a predetermined time after the welding circuit is interrupted, in order to facilitate recommencement of the welding operation. Should the operator interrupt the welding circuit for greater than the predetermined interval of time, which may, for example, be approximately 2 seconds, the time delay relay 30 returns to the deenergized position. Contact members 30b open, interrupting the energizing circuit for the operating winding 28 of the switch 27, so that the switch opens the shunt circuit and inserts the impedance 26 in the primary circuit of the transformer welder 12, reducing the open circuit secondary voltage thereof to a safe value.

Figure 2:
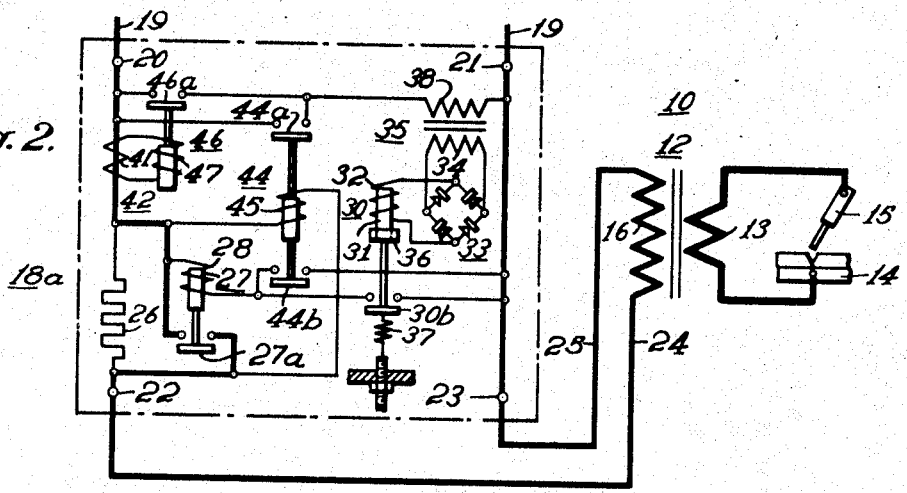
Fig. 2 illustrates diagrammatically an application of a different embodiment of the invention.

Referring to Fig. 2, it may be seen that the control unit 18a is generally similar to the control unit 18 of Fig. 1, except that the shunt circuit about the impedance 26 may be initially completed by completing an energizing circuit for the operating winding 28 of the switch 27 through the contact members 44b of a relay such as the voltage relay 44. The operating winding 45 of the voltage relay 44 may be connected in parallel circuit relation with the impedance 26, and may be so designed that the voltage across the impedance 26 when the welding circuit is open, is insufficient to operate the relay, while the voltage thereacross which becomes practically equal to the voltage of the source when the welding circuit is closed, is sufficient.

In order to maintain the switch 27 in the closed position during a welding operation when the voltage across the impedance 26 is reduced to substantially zero, the primary winding 38 of the control transformer 35 may be initially connected to the source of alternating current through contact members 44a of the voltage relay so as to effect operation of the time delay relay 30, as soon as the voltage relay 44 operates. Since the time delay relay 30 remains in the energized position for a predetermined interval of time after its operating winding 32 is deenergized, the time delay relay 30 maintains the energizing circuit for the operating winding 28 of the switch 27 for a definite period after the switch 27 closes and the voltage relay 44 is deenergized thereby. Thereafter, the energization of the operating winding of the time delay relay 30 may be maintained during a welding operation by suitable means, such as the current responsive relay 46, which may be provided with an operating winding 47 connected to the secondary winding 41 of the current transformer 42 so as to be responsive to a normal value of primary current during a welding operation.

When the operator brings the electrode 15 into contact with the work 14, short-circuiting the secondary winding 13 of the transformer welder 12, the voltage drop across the primary winding 16 is greatly reduced, and the current therethrough increased, so that the voltage drop across the impedance 26 increases substantially. The increased voltage effects operation of the voltage relay 44, which simultaneously connects the primary winding 38 of the control transformer 35 and the operating winding 28 of the switch 27 to the source of alternating current through the contact members 44a and 44b, respectively. The time delay relay 30 operates, and the switch 27 closes, providing a shunt circuit about the impedance 26.

The voltage relay 44 is, therefore, deenergized, but the switch 27 is maintained in the closed position, since the operating winding 28 is connected to the alternating current source through the contact members 30b of the time delay relay 30. When the current in the primary winding 16 reaches a predetermined value, the current responsive relay 46 operates, connecting the primary winding 38 of the control transformer 35 to the alternating current source through contact members 46a to effect energization of the operating winding 32 of the time delay relay 30 during the continuance of the welding operation.

Figure 3:
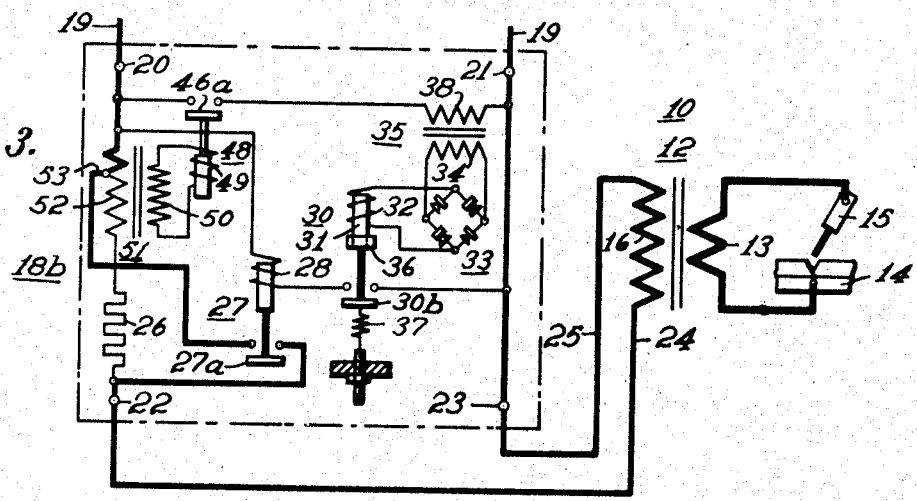
Fig. 3 illustrates diagrammatically a further embodiment of the invention applied to a welding system utilizing a transformer type of alternating current arc welder.

Referring to Fig. 3, it will be seen that the protective control unit 18b thereof is generally similar to the control units 18 and 18a of Figs. 1 and 2, respectively, except that the current responsive relay 48 of Fig. 3 is provided with an operating winding 49 connected to the secondary winding 50 of a current transformer 51, the primary winding 52 of which is connected in series circuit relation with the impedance 26 and provided with a tap 53 adjacent one end. When the welding circuit is open, a relatively small magnetizing current flows through the entire primary winding 16 of the transformer welder 12, which is insufficient to effect operation of the current responsive relay 48. When the welding circuit is closed, the current in the primary winding 16 increases sufficiently to effect operation of the current responsive relay 48 which, as hereinbefore described in connection with the relay 39 of Fig. 1, completes an energizing circuit for the operating winding 32 of the time delay relay 30, which in turn completes the energizing circuit for the operating winding 28 of the switch 27. By connecting the contact members 27a to the tap 53 and the remote end of the impedance 26 and thus providing a shunt circuit about the impedance 26 and a portion of the primary winding 52 of the current transformer 51, the ratio of the current transformer 51 may be sufficiently changed when the switch 27 operates to apply full voltage to the primary winding 16, so as to limit the current in the secondary winding 50 to a reasonable value under welding conditions and not overload the operating winding 49.

When the welding circuit is opened, the current responsive relay 48 returns to the deenergized position deenergizing the time delay relay 30, which functions in a manner similar to that hereinbefore described in connection with Figs. 1 and 2 to retain the switch 27 in closed position for a predetermined interval of time after the interruption of the welding circuit.

From the above description and the accompanying drawing it will be apparent that I have provided a simple and effective safety or protective control unit for alternating current arc welders of the transformer type which may be easily connected in the primary circuit of the welder without requiring any taps on either the primary or secondary windings of the transformer. Such a control unit may thus be readily applied to various types of alternating current arc welders which are already in use without requiring any changes or modifications of the welders themselves. The control unit is simple and inexpensive to manufacture, and it requires no particular connections to the welding transformer other than the usual conductors connecting the transformer to the source of welding current.

A protective unit embodying the features of my invention may be either built-in with the welder or manufactured as a separate and distinct unit. The protective control unit so operates that any failure of any of the control elements insures that full open circuit voltage of the welder will not be applied accidentally to the welding circuit, and thus it affords the maximum protection to the welding operator.

Since certain changes may be made in the above description, and different embodiments of the invention may be made without departing from the spirit and scope thereof, it is intended that all matter contained in the above description and shown in the accompanying drawing be considered as illustrative and not in a limiting sense.

I claim as my invention:

1. A protective control system for a transformer comprising, an impedance for connection between the transformer and a source of alternating current power therefor, means operable to render the impedance ineffective, relay means operable to effect operation of the aforesaid means, a control relay having an operating winding energized in accordance with the value of the current drawn by the transformer from the source responsive to a predetermined value of current for controlling operation of the relay means, and means controlled by the relay means for limiting the current through the operating winding of the control relay.

2. A protective control system for an alternating current transformer comprising, an impedance for reducing the voltage applied to the primary winding, switch means operable to shunt said impedance, a time delay relay energizable to effect operation of the switch means for a predetermined time after the time delay relay is deenergized, a control relay controlling the energization of the time delay relay, means for energizing the control relay to effect operation of said relay in response to a predetermined value of current supplied to the transformer, and means for limiting the energization of the control relay when the current supplied to the transformer reaches the predetermined value.

3. The combination with a transformer having a primary winding connected to a source of alternating current and a secondary winding, of an impedance connected in series circuit relation with the primary winding of the transformer, a current transformer having a primary winding with a tap connected in series circuit relation with the impedance and a secondary winding, means including a control switch and circuit means connected to the tap for providing a shunt circuit across the impedance and a portion of the current transformer primary winding, a current responsive relay energized from the secondary winding of the current transformer, and a time delay relay operable for a predetermined time after deenergization to effect operation of the control switch energized in response to operation of the current responsive relay.

4. A safety control system for alternating current transformer type arc welders comprising, an impedance for connection to one terminal of the primary winding of the welder, a current transformer having a primary winding connected in series circuit relation with the impedance and a secondary winding, switch means operable to shunt the impedance, time delay means operable for a predetermined time after deenergized to effect operation of the switch means, a control relay energized from the secondary winding of the current transformer for controlling the energization of the time delay relay in accordance with predetermined current values in the primary winding of the current transformer, and means including a control resistor controlled by the time delay relay to limit the energization of the control relay.

5. A voltage reducing system for a load circuit adapted to be connected to a source of alternating current comprising, an impedance connected in series circuit relation with the load circuit under light load conditions, impedance means connected in series circuit relation with the said impedance, control means operable to shunt the impedance and a portion of the impedance means, time delay means operable to effect substantially immediate operation of the control means, and means energized from the impedance device to effect operation of the time delay means in response to increase of the load above a predetermined value.

6. A protective system for a transformer having a primary winding for connection to an alternating current source and a secondary winding comprising, an impedance connected in series circuit relation with the primary winding, a current transformer having a secondary winding and a primary winding with a tap connected in series circuit relation with the impedance, switch means connected between the tap and one end of the primary winding, time delay means operable to control the switch means, and means energized from the secondary winding of the current transformer to control the operation of the time delay means.

GEORGE E. KING.